United States Patent [19]

Fertl et al.

[11] 4,415,805

[45] Nov. 15, 1983

[54] METHOD AND APPARATUS FOR EVALUATING MULTIPLE STAGE FRACTURING OR EARTH FORMATIONS SURROUNDING A BOREHOLE

[75] Inventors: Walter H. Fertl; Donald W. Oliver, both of Houston, Tex.

[73] Assignee: Dresser Industries, Inc., Dallas, Tex.

[21] Appl. No.: 274,960

[22] Filed: Jun. 18, 1981

[51] Int. Cl.³ ............................................. G01V 5/00
[52] U.S. Cl. .................................................. 250/260
[58] Field of Search ............... 250/253, 256, 259, 260

[56] References Cited

U.S. PATENT DOCUMENTS

| | | | |
|---|---|---|---|
| 2,951,535 | 9/1960 | Mihram et al. | 250/260 |
| 3,134,904 | 5/1964 | Hubbard, Jr. et al. | 250/260 |
| 3,151,246 | 9/1964 | Mardock | 250/260 |
| 3,248,540 | 4/1966 | Youmans | 250/260 |
| 3,424,903 | 1/1969 | Lawson | 250/260 |
| 3,600,582 | 8/1971 | Davis et al. | 250/260 |
| 3,848,124 | 11/1974 | Vann | 250/260 |
| 4,173,718 | 11/1979 | Fertl | 250/259 |
| 4,178,506 | 12/1979 | Fertl | 250/260 |
| 4,199,680 | 4/1980 | Moon | 250/260 |

Primary Examiner—Janice A. Howell
Attorney, Agent, or Firm—Richard M. Byron; Patrick H. McCollum

[57] ABSTRACT

A multiple stage formation fracturing operation is conducted with separate radioactive tracer elements injected into the well during each stage of the fracturing operation. After completion of the fracturing operation the well is logged using natural gamma ray logging. The resulting signals are sorted into individual channels or energy bands characteristic of each separate radioactive tracer element. The results of the multiple stage fracturing operation are evaluated based on dispersement of the individual tracer elements.

8 Claims, 2 Drawing Figures

METHOD AND APPARATUS FOR EVALUATING MULTIPLE STAGE FRACTURING OR EARTH FORMATIONS SURROUNDING A BOREHOLE

BACKGROUND OF THE INVENTION

This invention relates generally to well logging methods and apparatus for investigating subsurface earth formations traversed by a borehole and, more specifically, relates to methods and apparatus for evaluating fractures resulting from multiple stage fracturing of earth formations surrounding a borehole.

The concept of fracturing or formation breakdown has been recognized by the oil industry for many years. Fracturing is useful to overcome wellbore damage, to create deep-penetrating reservoir fractures to improve productivity of a well, to aid in secondary recovery operations, and to assist in the injection or disposal of brine and industrial waste material. The techniques of formation fracturing include injecting under pressure into a well bore a fracture fluid and igniting high explosives within the well bore.

Hydraulic fracturing consists essentially in breaking down a producing section of subsurface formation by the application of a fracture fluid under high pressure into the well bore. The composition of the fracture fluid is varied and can include water, acid, cement and oil. Dissolved in the fracture fluid is a material which invades the fractures created by the pressure application and serves to prevent them from closing again when the pressure is released.

Advances in the field of fracturing have yielded several multiple fracturing procedures. One form of multiple fracturing consists in submitting a single production zone to several repeated fracturing operations. The purpose is to further extend formation fractures created by the previous fracturing operation to provide thorough fracturing of a producing zone.

Another multiple fracturing procedure has been devised wherein several formation zones are fractured by subjecting them to successively higher fluid pressures. After the first pressure application, the fractures formed are temporarily sealed at the wall of the well with a chemical reagent carrying suspended solids. The pressure is then increased until a new set of fractures forms in a different formation zone. The procedure is repeated a numbers of times, after which the sealing agent is liquified by chemical treatment, thus opening all of the fractures and leaving multiple formation zones fractured.

It is desirable to evaluate each of the several successive fracture treatments to determine the degree of fracturing created by each treatment and to determine which formation zone was fractured by any one particular treatment. Previously, the evaluation consisted of logging the formations surrounding the borehole after each of the successive fracturing treatments. The logging operation can involve one of several recognized logging instruments including the induction log, dip meter and variable density acoustic log. Such successive logging operations are costly in loss of time involved and in the expenditure of mony required for the service.

These and other disadvantages are overcome with the present invention by providing methods and apparatus for evaluating multiple stage fracturing treatments in a single logging operation conducted after the completion of the entire multiple fracturing operation.

SUMMARY OF THE INVENTION

The present invention provides methods and apparatus for evaluating multiple stage fracturing treatment of subsurface formations by utilizing a separate and distinct radioactive tracer element in each individual fracturing stage. A high-resolution, gamma ray spectrometer incorporated in a well logging instrument is caused to traverse a borehole, whereby natural gamma radiation strikes a scintillation crystal contained therein. The detected gamma rays striking the crystal cause the crystal to emit photons in the visible energy region, the intensity of which is proportional to the energy lost in the crystal by the incident gamma ray. Light energy from the crystal is optically coupled to a photomultiplier tube where the energy is converted to a proportional electrical signal which is amplified and transmitted to processing circuitry.

Upon receipt of the pulses in the processing circuitry, the pulses are passed through a multi-channel analyzer where the pulses are sorted according to amplitude. The channels of the analyzer are selected to pass pulses representative of the gamma radiation caused by the radioactive tracer elements injected into the formation during the multiple stage fracturing treatment. The individual channel count rates are coupled into count rate meters, each of which measures the total number of pulses representing the detected gamma rays in an associated channel or energy band. The output signal from each count rate meter is coupled into a recording device to allow analysis of the individual signals for evaluation of the individual stages of the multiple stage fracturing operation.

Accordingly, it is a feature of the present invention to provide new and improved methods and apparatus for evaluating fracturing operations of subsurface earth formations surrounding a borehole.

It is another feature of the present invention to provide new and improved methods and apparatus for detecting a plurality of radioactive tracer elements on a single logging operation.

It is yet another feature of the present invention to provide new and improved methods and apparatus to obtain simultaneously a plurality of radioactive tracer logs, each log representative of a single radioactive tracer element injected during a multiple stage fracture treatment.

These and other features and advantages of the present invention can be understood from the following description of several techniques of producing the invention described in conjunction with the following drawings.

DETAILED DESCRIPTION OF THE PREFERRED EMBODIMENT

Radioactivity tracer logging is often used in applications of geophysical prospecting. A radioactive material, known as the tracer material, is distributed within the well. The well is thereafter logged using radioactivity well logging instruments to obtain indications of the distribution assumed by the tracer element with respect to the formation and of the fluids of the well bore. Present art and literature describe numerous applications of tracer logging techniques to provide information reflecting particular characteristics of underground formations and the manner in which fluid moves in the underground formations. The following description provides improvements in such tracer logging methods and apparatus.

Figure 1:
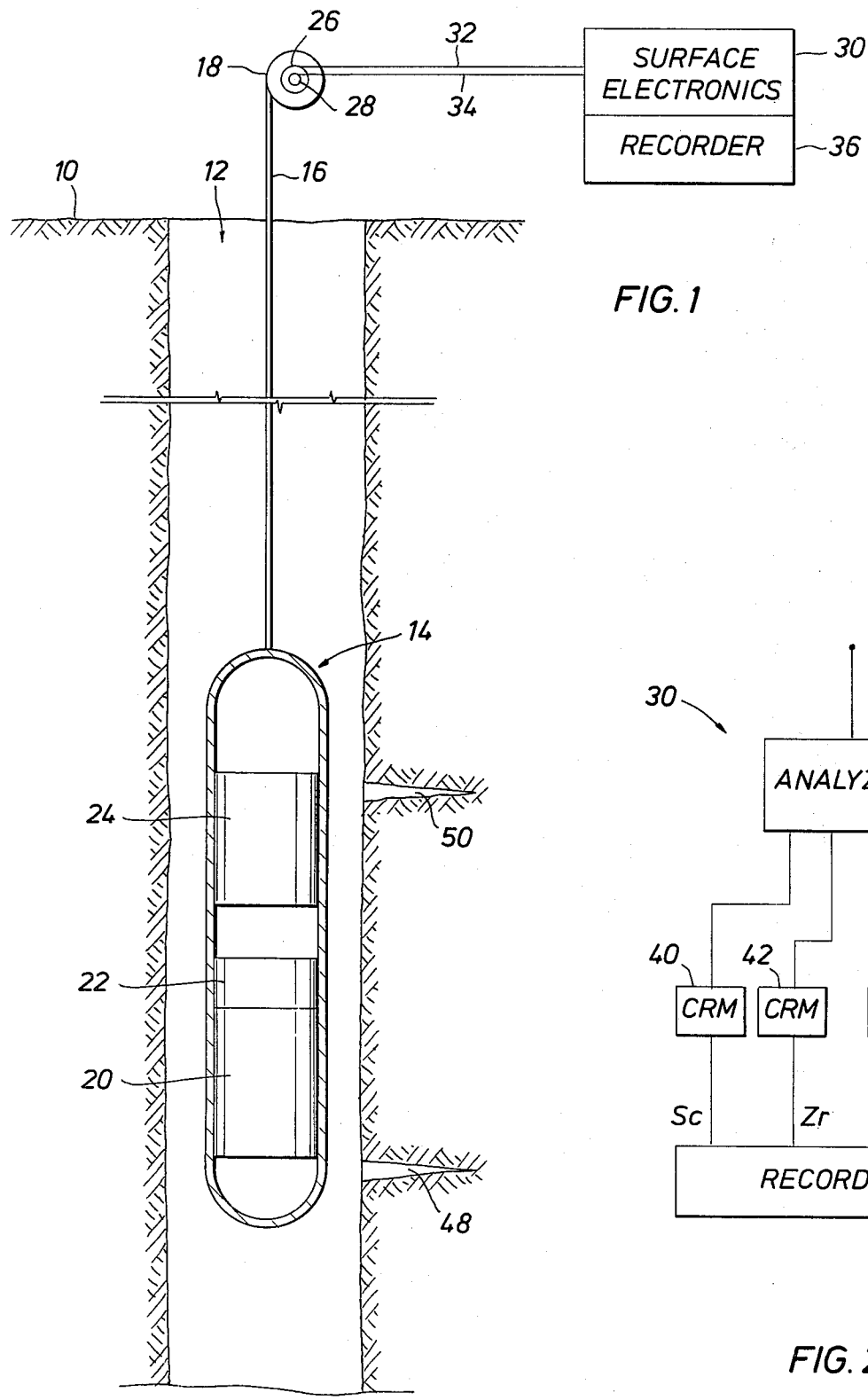
FIG. 1 is a side elevation, partly in cross-section, of a borehole logging instrument in operative position and its associated surface circuitry and related equipment.

Referring now to the drawings in more detail, especially to FIG. 1, there is illustrated schematically a radioactivity well surveying operation in which a portion of the earth 10 is show in vertical section. A well 12 penetrates the earth's surface 10 and may or may not be cased. A well logging instrument 14 is suspended inside the well 12 by a cable 16 which contains the required conductors for electrically connecting the instrument 14 with the surface apparatus. The cable 16 is wound on or unwound from the drum 18 in raising and lowering the instrument 14 to traverse the well 12.

The well logging instrument 14 includes a high-resolution gamma spectrometer comprised of a crystal 20 which is optically coupled with a photo-multiplier tube 22. In the preferred embodiment crystal 20 comprises a cesium-iodide, thallium activated crystal. The electrical output from the photomultiplier tube 22 is coupled to subsurface electronic circuitry 24 which is coupled to the surface by electrical conductors (not shown) within cable 16. The electrical signals passing along the cable 16 are taken off the slip rings 26 and 28 and sent to the surface electronics 30 by conductors 32 and 34, respectively.

In the operation of the logging system of FIG. 1, instrument 14 is caused to traverse well 12. Natural gamma radiation from various resources within the earth formation impinge upon scintillation crystal 20, producing light flashes whose intensity is proportional to the energy released due to the collision of the gamma ray with the crystal, thereby causing the scintillation. The light flashes are detected by photomultiplier tube 22 which produces an electrical pulse whose amplitude level is proportional to the intensity of the above described light flash.

These electrical signals, in the form of pulses, are coupled into subsurface electronic circuitry 24 for amplification and transmission to the surface by way of cable 16. The amplified pulses, representative of the energy of the detected gamma radiation in the earth formation, are coupled into the surface electronics 30.

Figure 2:
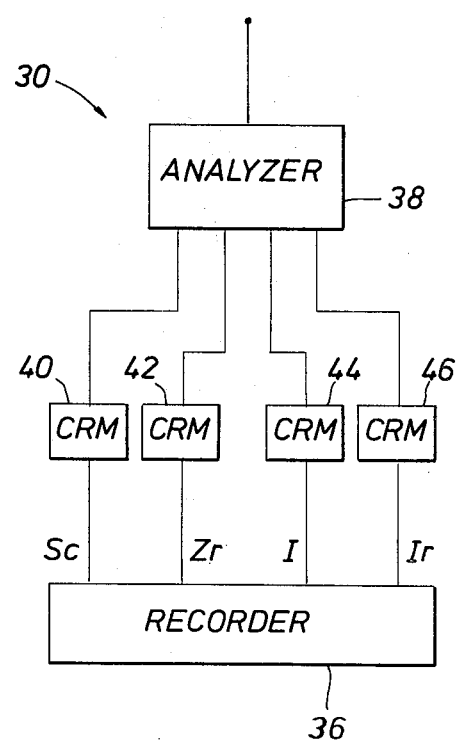
FIG. 2 is a block diagram of a portion of the surface circuitry according to the present invention.

Referring now to FIG. 2, there is illustrated a portion of surface electronics 30. The amplified pulses, representative of the energy of the detected gamma radiation, are coupled into a multi-channel analyzer 38 which sorts gamma radiation as a function of energy level. The pulses are separated into a number of energy channels or bands representative of the radioactivity characteristics of the tracer elements used in the multiple stage fracturing operation. While numerous tracer elements could be used, the preferred embodiment contemplates the use of Scandium 46, Zirconium 95, Iodine 131 and Iridium 192.

The tracer element Scandium 46 has a radioactive half-life of approximately eight-three days and is characterized by gamma radiation at the energy levels of 1.1205 Mev and 0.8894 Mev. The tracer element Zirconium 95 has a radioactive half-life of sixty-five days and is characterized by gamma radiation at the energy levels of 0.756 Mev and 0.724 Mev. Iodine 131 is characterized by gamma radiation at the energy levels of 0.7229 Mev, 0.637 Mev, 0.365 Mev and 0.284 Mev. Over ninety percent of the characteristic gamma radiation of Iodine 131 is at 0.365 and 0.284 Mev. Iridium 192 is characterized by gamma radiation at the energy levels of 0.604 Mev, 0.308 Mev and 0.468 Mev with the majority being at 0.308 Mev and 0.468 Mev. Iodine 131 has a radioactive half-life of approximately eight days and Iridium 192 has a radioactive half-life of over seventy-four days.

From the foregoing discussion it is seen that the multi-channel analyzer 38 can be set to separate the detected gamma radiation into individual channels or energy bands chracteristic of the elements represented by the detected radiation. By way of example, Scandium 46 gamma rays could be sorted into an energy band from between 0.8 Mev and 1.2 Mev, Zirconium 95 gamma rays could be sorted into an energy band from between 0.7 Mev and 0.8 Mev, Iodine 131 gamma radiation could be within energy bands from between 0.25 Mev and 0.4 Mev and Iridium 192 could be represented by the gamma rays in the band from between 0.3 Mev and 0.5 Mev. These energy bands are not intended to be limiting of the invention. Any energy range representing the elements under investigation could be used.

Returning to FIG. 2, signals from individual channels or energy bands of the multi-channel analyzer 38 are coupled into count rate meters 40, 42, 44 and 46. Each count rate meter 40, 42, 44 and 46 accumulates counts characteristic of the particular radiactive element associated therewith. The count rate meters 40, 42, 44 and 46 provide output signals to recorder 36 representative of the number of counts occurring in each band. Each count rate signal is characteristic of a respective radioactive tracer element injected during a fracturing operation.

In practicing the present invention, during the first stage of a multiple stage fracturing treatment, a first radioactive tracer element is injected into the well. As the fracturing pressure is increased a first formation zone is fractured, as illustrated by fracture 48 shown in FIG. 1. The first radioactive tracer element will be deposited within fracture 48.

As previously herein described, the next successive fracturing stage will be either to extend the fractures within the first zone or to cause fracturing within a second different zone, illustrated by fracture 50 of FIG. 1. On either instance the second fracturing operation will deposit a second, different radioactive tracer element. This tracer element will be deposited within the extended fractures or within the fractures created within the second fractured zone. The multiple fracturing operation is continued utilizing a separate radioactive tracer element in each successive fracturing stage. Therefore, the fractures created by each fracturing stage will have deposited therein a distinct radioactive tracer element.

Upon completion of the multiple stage fracturing operation the well logging instrument 14 is caused to traverse the well 12. Natural gamma radiation strikes the crystal 20 causing crystal 20 to emit photons in the visible energy region. The light energy is optically coupled to the photo-multiplier tube 22 where the energy is converted to electrical pulses which are amplified and transmitted to the surface electronics 30 by subsurface electronics 24.

At the surface, the pulses are passed through the multi-chase analyzer 38 where the pulses are sorted for each depth point according to amplitude. The analyzer 38 will be set into channels or energy regions relating to the separate radioactive tracer elements utilized in the multiple stage fracturing operation. As previously stated, in the preferred embodiment these energy bands are set to pass pulses characteristic of Scandium 46, Zirconium 95, Iodine 131 and Iridium 192. The separate channel or energy band signals are coupled to count rate meters 40, 42, 44 and 46, the outputs of which are coupled to recorder 36. It should be recognized that the output signal from each individual count rate meter 40, 42, 44 and 46 will provide a depth related log functionally related to the location within the well of individual tracer elements. By so doing there is provided a method and apparatus for evaluating the extent and quality of fractures created by the multiple stage fracturing operation with a single log of the borehole.

Thus, there has been described and illustrated herein methods and apparatus in accordance with the present invention which provides for evaluating a multiple stage fracturing operation. However, while particular embodiments of the present invention have been described and illustrated, it is apparent to those skilled in the art that changes and modifications may be made without departing from the invention in its broader aspects. For example, while the preferred embodiment contemplates use in uncased boreholes, it is also applicable to cased holes as well. Furthermore, while several radioactive tracer elements are described, numerous other tracer elements can be utilized without departing from the invention.

The embodiments of the invention in which an exclusive property or privilege is claimed are defined as follows:

1. A method for evaluating the artificial fracturing of earth formations traversed by a borehole, comprising the steps of:
    successively delivering into said borehole a fracture fluid, each successive delivery containing a radioactive tracer element having a unique gamma radiation energy characteristic;
    traversing said borehole with a gamma ray detector system; and
    selectively measuring radiations having energies characteristic of each of said tracer elements, said measurements indicating the profile of said artificial fracturing.

2. A method for evaluating multiple stage fracturing of earth formations traversed by a borehole, comprising the steps of:
    repeatedly injecting into said borehole a fracture fluid containing radioactive tracer elements, each injecting step having a tracer element emitting radiations of an energy different from the energies of radiations emitted by the other tracer elements;
    traversing said borehole with a logging instrument containing a natural gamma radiation detector;
    generating signals functionally related to the energy and frequency of gamma radiation detected by said detector; and
    separating said signals into a plurality of energy regions corresponding to the radiation produced by each of said radioactive tracer elements, said signals being indicative of the profile of said multiple stage fracturing.

3. A method of determining the distribution of radioactive tracer elements injected into subsurface earth formations during multiple stage fracturing, comprising:
    traversing a borehole penetrating said earth formations with a natural gamma radiation detector system;
    detecting natural gamma radiations emitting from said earth formations; and
    separating said detected radiations into energy regions functionally related to each of said tracer elements, said energy regions being representative of the distribution of said tracer elements in said subsurface formations.

4. The method of claim 1, 2, or 3 wherein said radioactive tracer elements are selected from the group consisting of Scandium, Zirconium Iodine, and Iridium.

5. A method for evaluating an artificial fracture in a subsurface earth formation traversed by a borehole, comprising the steps of:
    injecting a first fracture fluid containing a first radioactive tracer element into said formation;
    injecting a second fracture fluid containing a second radioactive tracer element into said formation;
    traversing said borehole with a natural gamma radiation detector;
    generating signals functionally related to natural gamma radiation detected by said detector; and
    separating said signals into two energy regions corresponding to the radiation produced by each of said first and second radioactive tracer elements.

6. The method of claim 5, further comprising:
    injecting a third fracture fluid containing a third radioactive tracer element into said formation; and
    deriving a third energy region signal corresponding to the radiation produced by said third radioactive tracer element.

7. The method of claim 6, further comprising:
    injecting a fourth fracture fluid containing a fourth radioactive tracer element into said formation; and
    deriving a fourth energy region signal corresponding to the radiation produced by said fourth radioactive tracer element.

8. The method of claim 7 wherein said steps of deriving said energy region signals comprises the steps of:
    deriving said first energy region signal corresponding to the energy band from 0.8 to 1.2 Mev;
    deriving said second energy region signal corresponding to the energy band from 0.7 to 0.8 Mev;
    deriving said third energy region signal corresponding to the energy band from 0.25–0.4 Mev; and
    deriving said fourth energy region signal corresponding to the energy band from 0.3–0.5 Mev.

* * * * *